INVENTORS
CLARENCE S. VINTON
EDWIN E. RICE
BY
ATTORNEYS

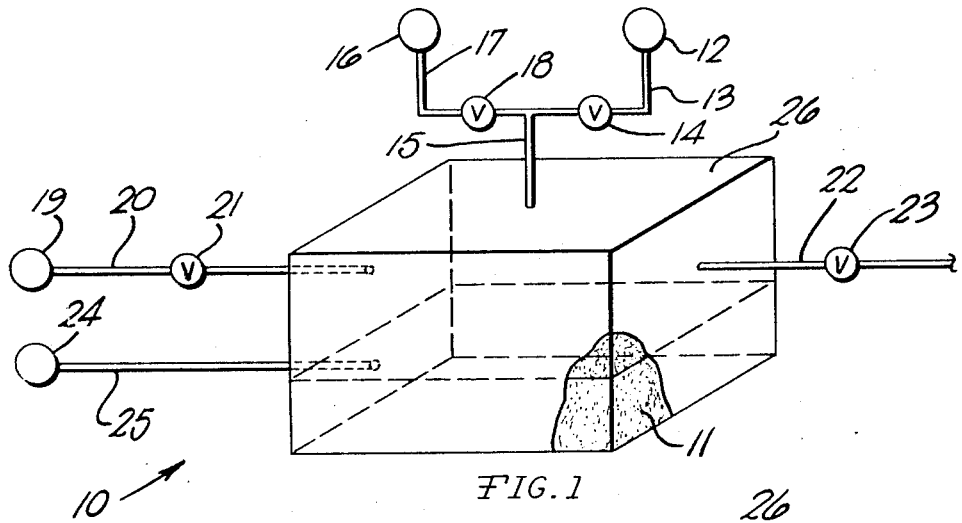
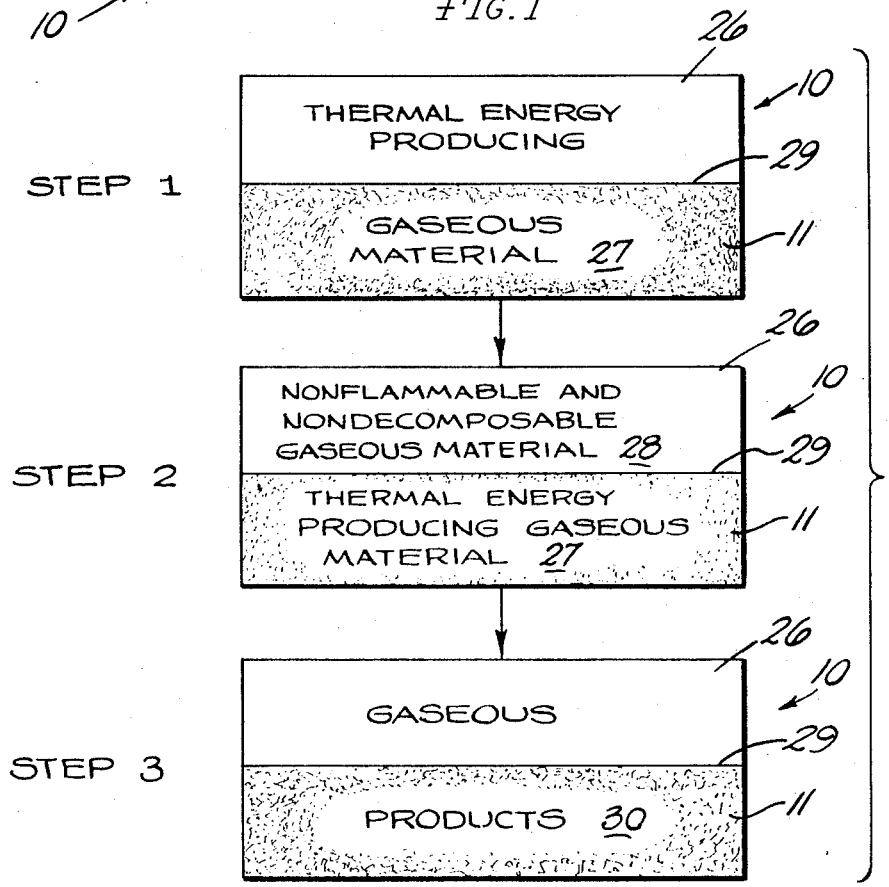

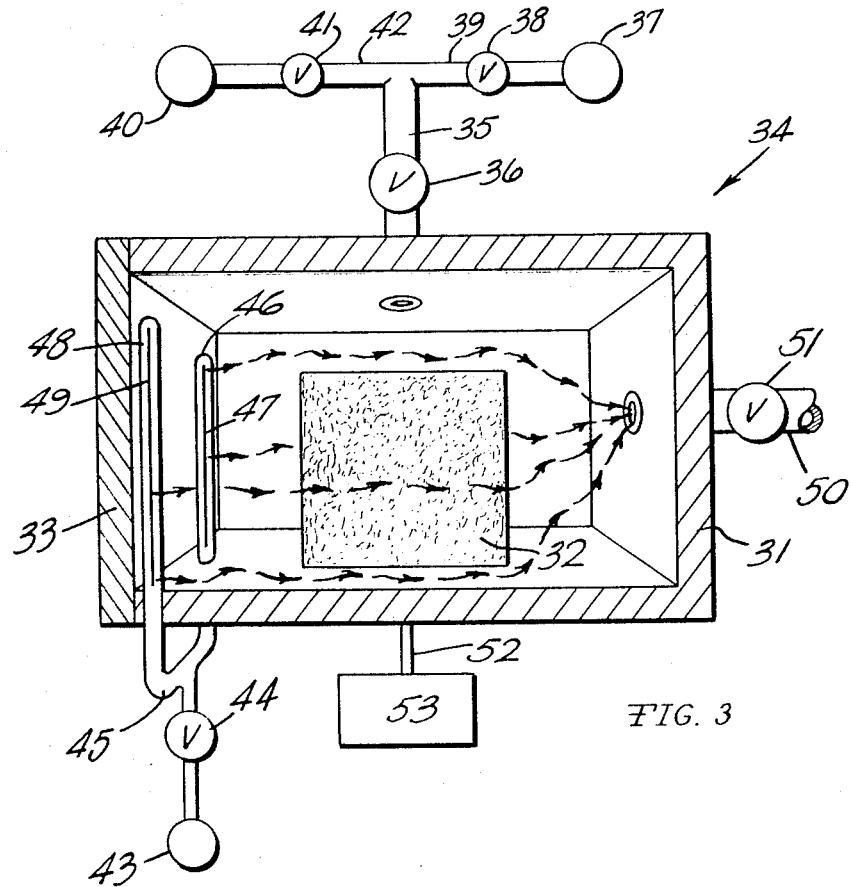
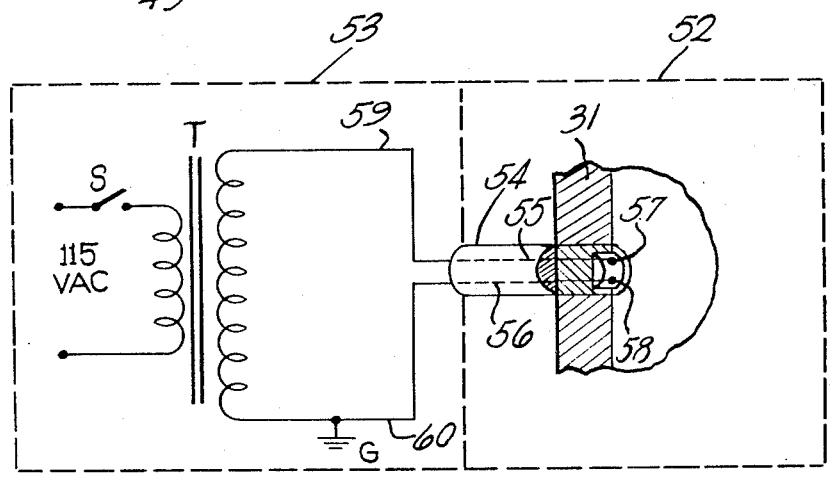
FIG. 3
FIG. 4
INVENTORS
CLARENCE S. VINTON
EDWIN L. RICE
BY
ATTORNEYS July 15, 1969 C. S. VINTON ET AL 3,456,047
PROCESS FOR THE TRANSIENT THERMAL TREATMENT OF A POROUS MASS
Filed June 29, 1967 3 Sheets-Sheet 3

United States Patent Office 3,456,047
Patented July 15, 1969

3,456,047
PROCESS FOR THE TRANSIENT THERMAL TREATMENT OF A POROUS MASS
Clarence S. Vinton and Edwin E. Rice, Ann Arbor, Mich., assignors to Chemotronics, Incorporated, Ann Arbor, Mich., a corporation of Michigan
Filed June 29, 1967, Ser. No. 650,087
Int. Cl. B29d 27/00
U.S. Cl. 264—80                                18 Claims

ABSTRACT OF THE DISCLOSURE

A process is described for the transient thermal treatment of a porous mass by initiating a reaction in a transient thermal energy producing gaseous material (combustible or decomposable) within the porous mass provided in a confined space containing the porous mass and an external void space between the porous mass and walls defining the confined space. A nonflammable and nondecomposable gas such as nitrogen is provided in the external void space in order to at least attenuate pressure waves, which would form and propagate in the external void space upon initiation of the reaction in the transient thermal energy producing gaseous material in the external void space and which would deform, melt, decompose, discolor or otherwise damage the porous mass.

SUMMARY OF INVENTION

This invention relates to an improved process for the treatment within a confined space of a porous mass, which is smaller in bulk volume than the volume of the confined space such that an external void space is present, by initiating a reaction in a transient thermal energy producing gaseous material (combustible or decomposable) within the porous mass to treat the internal surfaces of the porous mass with the transient heat which constitutes the elimination or attenuation of pressure waves in the external void space which would damage the porous mass. In particular, the present invention relates to an improved process wherein a nonflammable and nondecomposable gaseous material is provided in the external void space between the porous mass, containing the transient thermal energy producing gaseous material, and walls defining the confined space so that major pressure waves will not form and propagate in the external void space upon initiating a reaction in the transient thermal energy producing gaseous material present within the porous mass.

PRIOR ART

In United States Patent No. 3,175,025, a process is disclosed wherein the transient thermal energy produced from the ignition of a combustible material is used to treat various porous masses, particularly cellular materials. This process works very well to accomplish this result without destroying the porous mass with the transient thermal energy.

A particular problem disclosed in this patent in the operation of the process comes from pressure waves which were generated and propagated in any voids present around the porous mass in the confined space causing damage to the porous mass, particularly when they are organic thermoplastic cellular materials. The solution proposed in this patent was to completely fill the confined space with the porous mass thereby preventing the formation and propagation of the high energy pressure waves around the porous mass.

In large scale production, using the process described in this patent, it is difficult and time consuming to carefully fit the porous mass into the confined space so that no void spaces are present around the porous mass. Many times the porous masses treated have varying outside configurations which would require a specially designed confined space or chamber for each configuration in order to fill the chamber. This has not been found to be practical for large scale production where porous masses with varying configurations are routinely encountered.

Various solid packing materials have been used to reduce or eliminate the void space between the confined space and the porous mass. This expedient reduces the formation and propagation of high energy pressure waves around the porous mass but is difficult to accomplish and is not very efficient for large scale production.

OBJECTS

It is thus an object of the present invention to provide a process for treating a porous mass with transient thermal energy by initiating a reaction in a transient thermal energy producing gaseous material within the porous mass wherein the pressure waves in the external void space are attenuated or eliminated without filling the confined space with the porous mass and without the use of solid or liquid packing materials in the confined space. It is further an object of the present invention to provide a process which results in pressure wave attenuation or elimination which is simple and economical for large scale production. These and other objects of the present invention will become increasingly apparent to those skilled in the art from the following description and by reference to the drawings.

In the drawings:

FIGURE 1 is a schematic perspective view illustrating the equipment used in the process of the present invention and particularly illustrates an external void space within the upper half of a chamber and a porous mass in the lower half of the chamber as shown by the partial section of the chamber.

FIGURE 2 is a schematic diagram illustrating the steps in the process of the present invention and particularly illustrating the step of providing a nonflammable and nondecomposable gaseous material in the external void space within the chamber shown in FIGURE 1.

FIGURE 3 is a front perspective view of equipment used in the process of the present invention cross-sectioned at the front side of the chamber, and particularly illustrating means for introducing the nonflammable gaseous material into the external void space between the porous mass and the chamber.

FIGURE 4 is a schematic diagram illustrating an electrical ignition system for the combustible mixture in the equipment shown in FIGURE 3 as well as a front view of the spark gap shown in FIGURE 3.

GENERAL DESCRIPTION

Figure 5:
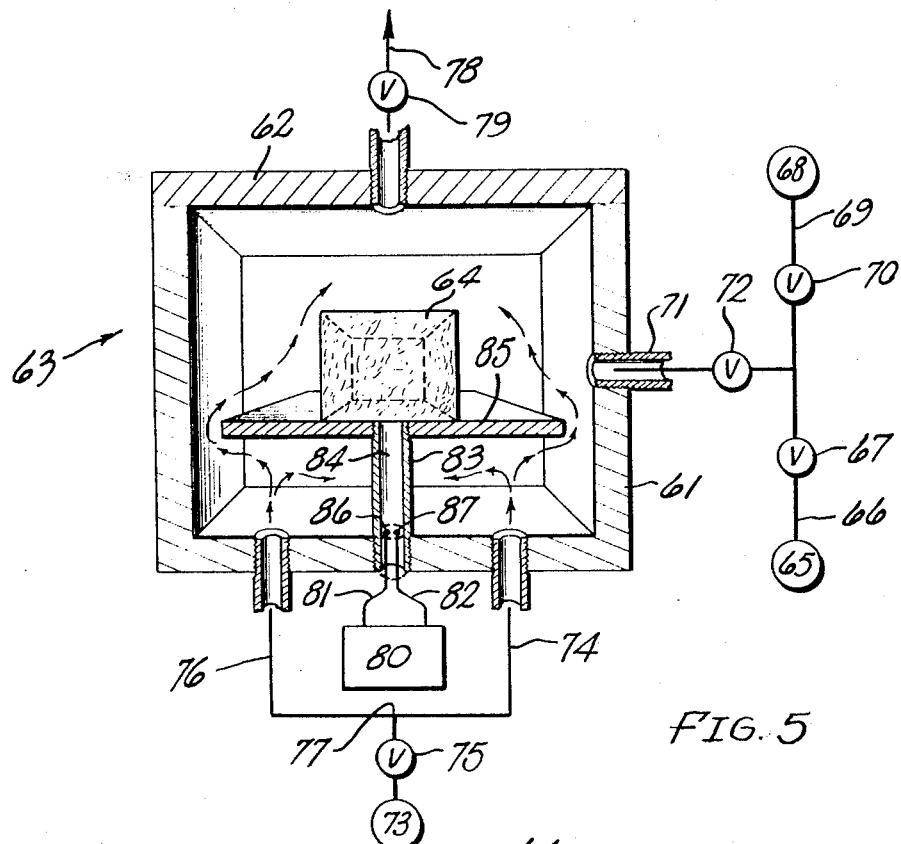
FIGURE 5 is a front perspective view of equipment used in the process of the present invention cross-sectioned at the center of the chamber, and particularly illustrating the use of a mounting platform for the porous mass within a chamber and an ignition tube supporting the mounting platform.

The present invention relates to an improvement in the process for treating with transient thermal energy in a confined space the internal surfaces of a porous mass with internal void space in communication with the outside surface of the porous mass and which is damageable by pressure waves resulting from initiating a reaction in a transient thermal energy producing gaseous material (combustible or decomposable) provided within the internal void space of the porous mass and the confined space, comprising: (a) providing the transient thermal energy producing gaseous material in the confined space and within the internal void space of the porous mass, the volume of the confined space being larger than the bulk volume of the porous mass to be treated such that there is an external void space between the porous mass to be treated and walls defining the confined space; (b) introducing a nonflammable and nondecomposable gaseous material into the external void space in sufficient amount to substantially reduce the pressure waves from the initiation of the reaction in the transient thermal energy producing gaseous material in the external void space without substantially removing the transient thermal energy producing gaseous material from the internal void space of the porous mass; and (c) initiating a reaction in the transient thermal energy producing gaseous material within the internal void space of the porous mass before there is substantial diffusion between the transient thermal energy producing gaseous material and the nonflammable and nondecomposable gaseous material. This process provides a means for attenuating or eliminating the pressure waves in the external void space between the porous mass and the confined space.

Pressure waves result from the initiation of the reaction in the transient thermal energy producing gaseous material which then form moving gaseous wave fronts which have much higher temperatures and pressures than those initially encountered in the static gaseous mixture. The pressure waves can comprise deflagration waves, moving at subsonic speeds, explosion waves moving at sonic speeds or detonation waves moving at supersonic speeds which generate essentially instantaneously high pressures and temperatures in the confined space. In the confined void space, the pressure waves tend to reinforce each other as they are reflected from the walls of the confined space producing waves with even greater temperatures and pressures. The result is that a porous mass provided in the confined space can be damaged even to the point of destruction by the pressure waves. The process of the present invention thus provides a means for avoiding or greatly attenuating the formation and propagation of pressure waves in a confined void space.

The phrase "external void space" as used herein means a space which does not contain solid material surrounding a porous mass to be treated. The phase "internal void space in communication with an outside surface of the porous mass" refers to a mass which has pores which are sufficiently interconnected or permeable to permit the introduction of the transient thermal energy producing gaseous material into the porous mass. In general, the internal void spaces in the porous mass can have a wide range of volumes.

FIGURES 1 and 2 schematically illustrate the equipment and the steps in the process of the present invention. Referring to FIGURE 1, a confined space 10 is provided. The confined space 10 is generally provided by a steel chamber with a cover and means for securing the cover to the chamber. A porous mass 11 is provided in the confined space 10 such that there is an external void space 26 (FIGURE 2) above the porous mass 11.

A vacuum system 12 is connected via conduits 13 and 15 through valve 14 into the confined space 10. A transient thermal energy producing gaseous material supply system 16 is connected via conduits 17 and 15 through valve 18 into the confined space 10. Conduits 13, 17 and 15 form a T; however, it will be appreciated that the vacuum system 12 and transient thermal energy producing gaseous material supply system 16 could each be individually connected to the confined space 10. A nonflammable and nondecomposable gaseous material supply or inlet system 19 is connected via conduit 20, through valve 21 into the external void space 26 in the confined space 10. A nonflammable and nondecomposable gaseous material outlet conduit 22 through a valve 23 is connected to the external void space 26 in the confined space 10. All of the valves 14, 18, 21 and 23 are to be considered as initially closed for purposes of the following discussion. A reaction initiating system 24 is provided in the confined space 10 such that it provides reaction initiation within the porous mass 11 through initiation means 25.

Referring to FIGURE 2, the steps of the process of the present invention are illustarted in the confined space 10. The process is accomplished in equipment such as schematically illustrated in FIGURE 1.

Step 1 includes providing a transient thermal energy producing gaseous material 27 in the confined space 10 and within the porous mass 11. This can be accomplished by actuating the vacuum system 12 and opening the valve 14 so that air is evacuated from the confined space 10 including air within the porous mass 11 and external void space 26. After this has been accomplished, the valve 14 is closed and the valve 18 from the combustible or decomposable gaseous material supply system 16 is opened to allow the transient thermal energy producing gaseous material 27 to fill the confined space including the internal void space of the porous mass 11 and external void space 26, thus completing step 1. The valve 18 is then closed. It has been found that the above described procedure is the best way to insure that the transient thermal energy producing gaseous material 27 is provided within the internal void space of the porous mass 11. However, it will be appreciated that other means of providing the transient thermal energy producing gaseous material 27 within the confined space 10 including the porous mass 11 and external void space 26 can be used such as by flowing the transient thermal energy producing gaseous material 27 through the confined space 10, particularly porous mass 11, but this is not preferred since a certain amount of transient thermal energy producing gaseous material 27 would have to be vented from the confined space 10 in flushing air from the confined space 10, thus causing waste.

Step 2 includes introducing the nonflammable and nondecomposable gaseous material 28 into the confined space 10 so that the combustible or decomposable gaseous material 27 is not substantially removed from the porous mass 11. In the preferred procedure, the valves 21 and 23 are opened and the nonflammable and nondecomposable gaseous material 28 is flowed through the external void 26, at low velocity and at a high flow rate in order to avoid removal of the transient thermal energy producing gaseous material 27 from the porous mass 11, from supply means 19 through a conduit 20 and valve 21 and vented through the outlet conduit 22 and valve 23. The flow of the nonflammable and nondecomposable gaseous material is shown in FIGURE 3. In this manner, transient thermal energy producing gaseous material 27 is removed from the external void space 26, but not substantially from the porous mass 11. Care must be taken in introducing the nonflammable and nondecomposable gaseous material 28 not to create turbulence such that substantial amounts of transient thermal energy producing gaseous material 27 are removed from the porous mass 11 particularly the surface 29. If substantially laminar flow of the nonflammable and nondecomposable gaseous material 28 is achieved, very little transient thermal energy producing gaseous material 27 is removed from the porous mass 11. The valves 21 and 23 are then closed. An alternate means of introducing the nonflammable and nondecomposable gaseous material 28 is to supply the external void space 26 of confined space 10 under pressure without opening the valve 23 of the outlet conduit 22 such that the transient thermal energy producing gaseous material 27 in the external void space 26 is forced into the porous mass 11 and thereby removed from the external void space 26. This latter procedure is not preferred because mixing of the transient thermal energy producing gaseous material 27 with the nonflammable and nondecomposable gaseous material 28 can occur in the external void space 26, thus allowing pressure waves a chance to form and propagate in the external void space 26 because of the initiation of a reaction in the diluted transient thermal energy producing gaseous material 27 in the external void space 26. It is thus preferred to flow the nonflammable and nondecomposable gaseous material 27 through the external void space 26.

Step 3 includes the initiation of a reaction in the transient thermal energy producing gaseous mixture 27 within the porous mass 11 causing a transient thermal treatment of the internal surfaces of the porous mass 11. The nonflammable and nondecomposable gaseous material 28 prevents the formation and propagation of pressure waves in the external void space 26 which would damage the porous mass 11. The initiation of the reaction should take place shortly after the introduction of the nonflammable and nondecomposable gaseous material 28 to avoid substantial diffusion between the gases at the surface 29 of the porous mass 11 and leaves gaseous products 30. The porous mass 11 and external void space 26 can be flushed with air after the transient thermal treatment is completed and the porous mass 11 removed from the confined space 10 as disclosed in United States Patent Number 3,175,025.

Thus, as can be seen, an improved process is provided in Steps 1, 2 and 3 as shown in FIGURE 2 in the equipment shown in FIGURE 1 wherein pressure waves are attenuated or eliminated in the external void space. Having generally described the process, the following is a specific description.

SPECIFIC DESCRIPTION

The following description includes specific examples illustrating the preferred process of the present invention.

Example I

FIGURES 3 and 4 illustrate one preferred embodiment of the equipment used in the process of the present invention. In particular, a rectangularly shaped chamber 31, made of steel, open at one end with a cover or door 33 was provided. The porous mass 32 to be treated was placed in the chamber 31. The porous mass 32 was smaller than the confined space 34 defined by the chamber 31. The cover 33 made of steel or like material was secured to the open side of the chamber 31 by hydraulically actuated locking lugs which are not shown. Other securing means can be used in order to secure the cover 33 in sealed relationship with the chamber 31 such as a hydraulic system (not shown) putting pressure on the cover 33 to seal it to the chamber 31 or with bolts or other closure means. Further, it will be appreciated that sealing means such as a gasket (not shown) can be provided between the cover 33 and the chamber 31. All of these equipment variations will be obvious to one skilled in the art of unfired pressure vessels.

A vacuum pump system 37 was connected through pipes 39 and 35 through valves 38 and 36 into the confined space 34 and a transient thermal energy producing gaseous material supply system 40 was connected through pipes 42 and 35 through valves 41 and 36 into the confined space 34. A nonflammable and nondecomposable gas inlet system 43 was provided through manifold 45 and valve 44 leading into the inside of the confined space 34 through the wall of the chamber 31. Inside the chamber 31 two pipes 46 and 48 were connected to the manifold 45, the longitudinal axis of the pipes 46 and 48 being parallel with the cover 33 of the chamber 31 and in the two corners of the confined space 34 adjacent the cover 33. One-quarter inch (¼") slots 47 and 49 were provided parallel to the longitudinal axis of the pipes 46 and 48 so that the inside of the pipes 46 and 48 were exposed to confined space 34 through the slots 47 and 49. The slots 47 and 49 in the pipes 46 and 48 were aimed at the opposite end of the chamber 31. At the opposite end of the chamber 31 from the nonflammable gas inlet pipes 46 and 48, a large diameter pipe 50 with a valve 51 was connected from the confined space 34 forming the nonflammable and nondecomposable gas outlet. The pipe 50 had a large diameter in order to insure the ease of flow of the nonflammable and nondecomposable gaseous material through the confined space 34. For purposes of this discussion, all of the valves 36, 38, 41, 44 and 51 are to be considered as closed.

An ignition system 53 was provided through the bottom of the chamber 31 by electrical lead 52. Referring to FIGURE 4, the electrical lead 52 is shown in detail such that a spark gap 57 and 58 was provided immediately adjacent to the porous mass 32. The spark gap 57 and 58 was electrically connected through conductors 55 and 56 to the ignition system 53. Conductors 55 and 56 were sheathed in an insulating member 54 sealed through the bottom of the chamber 31. Various known ignition systems 53 can be used, however, FIGURE 4 illustrates a preferred embodiment. In particular, conductors 55 and 56 were connected through conductors 59 and 60, respectively, to the high side (10,000 volts) of a transformer T. The low side of the transformer T was connected to a 115 volt 60 cycle alternating current source and a switch S was provided in this circuit. The confined space 34 formed by the chamber 31 and cover 33 had inside dimensions of 33 inches by 57 inches by 108 inches long.

The porous mass 32 comprised a block of polyester polyurethane cellular material with interconnected cells and with approximately 30 pores per linear inch. The polyurethane bun measured 24" x 42" x 72". The cellular material had a three dimensional skeletal structure of interconnected strands with the cell wall membranes attached to the strands such that they divided contiguous cells. The membranes were broken, thus providing interconnection between the cells for introduction of the transient thermal energy producing gaseous material within the cells. The object of the process hereinafter described was to reticulate the cellular material by the destruction of the cell membranes in the manner described in United States Patent Number 3,175,025 without deformation of the porous mass 32.

The cellular material forming the porous mass 32 was sealed in the chamber 31 by the cover 33 and with the hydraulically actuated locking lugs (not shown). The vacuum system 37 was actuated with valves 38 and 36 open and essentially all of the air was evacuated from the confined space 34 and from the internal void space of the cells in the cellular material forming the porous mass 32. After this was accomplished, valve 38 was closed. Valve 41 was then opened and a combustible gaseous material from the supply system 40 was introduced into the confined space 34 and within the cells of the porous mass 32. In this instance, the combustible gaseous material was a mixture of hydrogen and oxygen in a volumetric ratio of 2 to 1 hydrogen to oxygen and the mixture was charged to atmospheric pressure in the confined space 34. The valves 36 and 41 were then closed.

The nonflammable and nondecomposable gas system 43 was then actuated by opening valves 44 and 51 and nitrogen gas was inserted into the confined space 34 displacing the combustible gaseous material from the external void space in the confined space 34 causing the combustible gaseous material in the external void space in the confined space 34 to flow out through the valve 51 and pipe 50. The nitrogen gas was metered through a ¼" diameter orifice at 120 p.s.i.g. back pressure and was flowed into and through the confined space 34 for 55 seconds as shown by the arrows, to remove the hydrogen and oxygen which was not in the porous mass 32. The pipes 46 and 48 with the slots 47 and 49 helped to maintain an even flow of nonflammable and nondecomposable gaseous material through the confined space 34. The total amount of nitrogen passed into the confined space 34 was approximately twice the volume of the void space external to the porous mass 32 and within the confined space 34. The valves 44 and 51 were then closed.

The ignition system 53 was then actuated by closing the switch S shown in FIGURE 4 and the combustible mixture of hydrogen and oxygen was then ignited to produce the transient thermal energy (in this case a flame). The porous mass was then removed from the chamber 31 after opening the cover 33.

It was found that the cellular material comprising the porous mass was completely reticulated (with the membranes destroyed) except for a depth of about one-half inch from the surfaces exposed to the nonflammable and nondecomposable gas. The porous mass 32 was undamaged by the ignition of the combustible gaseous material even though there was a large external void space in the confined space 34 not filled by the porous mass 32.

Example II

The procedure of Example I was repeated with a porous mass 32 of cellular orange polyester polyurethane foam with approximately 15 pores per linear inch and measuring 22″ x 42″ x 73″ and using a mixture of natural gas and oxygen and the volumetric ratio of 2 parts of oxygen to 1.62 parts Texas natural gas (over 90% methane) at atmospheric pressure. The nonfiammable gas was nitrogen and a total of 120 cubic feet of nitrogen was utilized to remove the natural gas and oxygen from the confined space 34 in the chamber 31 but not substantially from the porous mass 32. It was found upon ignition of the natural gas and oxygen within the polyurethane foam that a reticulated polyurethane material was produced with the membranes destroyed except for a thin depth at the surface exposed to the nonflammable and nondecomposable gaseous material and that there was no damage to the reticulated polyurethane cellular material.

Example III

The procedure of Example I was repeated with a cellular polyester polyurethane foam with approximately 60 to 80 pores per linear inch and measuring 22″ x 43″ x 72″. The combustible material was a mixture of hydrogen and oxygen in a volumetric ratio of 3:1 at one atmosphere. The nonflammable gas was nitrogen and the sweep to remove the hydrogen and oxygen from the confined space 34 was 124 cubic feet inserted in 15 seconds.

It was found upon ignition of the hydrogen and oxygen within the polyurethane foam that a reticulated polyurethane material was produced with the membranes destroyed except for a thin depth at the surface exposed to the nitrogen and that the reticulated polyurethane material was not damaged in any way.

Example IV

The procedure of Example I was repeated with a cellular polyester polyurethane foam with approximately 20 pores per linear inch and measuring 16″ x 40″ x 72″. The combustible gaseous material was a mixture of hydrogen and oxygen in a volumetric ratio of 2:1 at one atmosphere absolute. The nonflammable and nondecomposable gas was carbon dioxide and the sweep to remove the hydrogen and oxygen from the confined space 34 was inserted into the sweep manifold 45 through a ¼″ diameter orifice with a 120 p.s.i.g. back pressure for 50 seconds.

It was found upon ignition that a reticulated polyurethane material was produced with the membranes destroyed except for a thin depth at the surface exposed to the carbon dioxide and the reticulated polyurethane material was not damaged in any way.

Example V

The procedure of Example I was repeated with a polyester polyurethane foam having a density of 4 pounds per cubic foot and measuring 50″ x 13″ x 73″. The combustible material was a mixture of hydrogen and oxygen in a volumetric ratio of 3:1 and was charged to a pressure of 1480 mm. absolute of mercury. The nonflammable and nondecomposable gas was nitrogen and the sweep to remove hydrogen and oxygen from the confined space 34 was inserted into the sweep manifold 45 through a ¼″ diameter orifice with a 500 p.s.i.g. back pressure for 32½ seconds. The exit pressure of the sweep was controlled so that the initial charge pressure was maintained.

It was found upon ignition that a reticulated polyurethane material was produced with the membranes destroyed except for a thin depth at the surface exposed to the nitrogen and the reticulated material was not damaged in any way.

Example V illustrates the use of elevated pressures in the confined space 34. In this manner a more energetic reaction within the porous mass can be produced. It was also found to be advantageous to drop the pressure in the confined space slightly just prior to the ignition of the combustible gaseous material in order to allow the transient thermal energy producing gaseous material to come to the surface of the porous mass, thereby more effectively treating the surface portions of the porous mass.

The procedure of Example I was repeated with various porous masses 32 in order to treat them with the transient thermal energy resulting from the initiation of a reaction in the transient thermal energy producing gaseous material. Thus, cellular materials of many kinds which have an integral porous network were so treated. Further, pieces of material maintained in contact such as plastic beads and the like were also so treated. Thermoplastic or thermosetting porous materials are particularly adaptable to treatment by the process of the present invention. The materials treated were composed of epoxy, phenolic, urea formaldehyde, polyester, polystyrene, polyethylene, polypropylene, vinyl (plasticized and unplasticized polyvinyl chloride and its copolymers), cellulose acetate, natural rubber and synthetic rubber materials and inorganic materials such as metal foams and glass and ceramic foams all of which would be damaged in some way upon initiation of a reaction in the transient thermal energy producing gaseous material upon the formation of and propagation of pressure waves in the confined space.

The transient thermal energy producing gaseous materials can be for instance a decomposable gaseous material such as acetylene alone or preferably combustible mixtures of an oxidizable gaseous material and an oxidizer gaseous material. Hydrogen or natural gas are preferred oxidizable materials because of the superior results obtained and because of low cost and ease of availability. Lower alkanes containing 1 to 4 carbon atoms, individually or in mixture as gases can be used with good results. Other oxidizable materials which can be used are for instance, ammonia, hydrazine, hydrogen sulfide, carbon monoxide and various hydrocarbons such as acetylene, ethylene oxide and ethylene. Suitable gaseous oxidizer materials are pure oxygen which is preferred, oxygen with gaseous diluents such as air, halogens such as fluorine, and chlorine and suitable gaseous decomposable materials are acetylene and various gaseous nitrogen containing materials which can act as oxidizers or be decomposed per se with the rapid or transient release of thermal energy. In general, it is preferred to use a molar excess of oxidizable materials to insure complete reaction of the oxidizer material and to prevent substantial oxidization of the surfaces of the porous mass; although in some instances it is desirable to have an excess of oxidizer so that the surfaces of the porous mass may be oxidized or the porous mass itself may contribute to the energy of the system by acting as a secondary oxidizable material. The combustible or decomposable gaseous materials can be provided in the confined space at elevated pressures in order to provide a more energetic reaction. The combustible or decomposable gaseous materials can be provided by heating various liquid or solid materials to the gaseous state and by heating the system. However, this procedure is not preferred because of the added expense involved.

The nonflammable and nondecomposable gaseous material can be selected from various stable oxidizable gaseous materials described above (providing they are used in the absence of an oxidizer in the external void gas composition) or from the relatively inactive gases such as nitrogen, carbon dioxide and the rare gases such as helium, argon and the like and from halogenated propellent gases such as the Freons T. M. Nitrogen is preferred because of its low cost and ready availability. It is desirable to use a nonflammable and nondecomposable gaseous material having a density approximately equal to the density of the combustible gaseous mixture to reduce the buoyancy effect. The phrase "nonflammable and nondecomposable gaseous material" as used herein means gases or mixtures of gases which will not support combustion per se and which are sufficiently stable chemically to be essentially unaffected by the combustion or decomposition of the combustible or decomposable gaseous material within the porous mass and which therefore do not contribute energy to the exothermic reaction occurring within the porous mass or within diluted combustible or decomposable gaseous material exothermically reacting in the external void space upon initiating the combustion or decomposition. Conversely, these gaseous materials absorb thermal energy from the exothermic reaction occurring as the result of the initiation of a reaction in the combustible or decomposable gaseous material.

The phrase "combustible gaseous material" has the usual and standard meaning and the phrase "decomposable gaseous material" as used herein means gases or mixtures of gases which will per se exothermically decompose (when initiated by the proper conditions) to form other compounds or elements at rates comparable to the exothermic gaseous combustible material reaction rates and with yields of thermal energy sufficiently great to perform thermal surface treatment of the porous mass at least comparable to what is performed by the ignition of a combustible gaseous material as described throughout this specification. An important consideration is that such decomposable gaseous materials must be self-propagating once the decomposition reaction is initiated at some point in the mixture; i.e. the decomposition must proceed spontaneously throughout the entire amount of decomposable gaseous material after initiation at a localized point.

The equipment used in the process of the present invention includes means for confining a porous mass and which is larger in confined volume than the porous mass, means for providing the combustible or decomposable mixture within the porous mass and in the external void space between the porous mass and walls defining the confined space, means for introducing the nonflammable and nondecomposable gaseous material into the confined space in order to at least dilute the combustible or decomposable gaseous material in the external void space and means for initiating a reaction in the combustible or decomposable gaseous material within the porous mass. It will be appreciated that there are numerous equipment variations for accomplishing this result.

Figure 6:
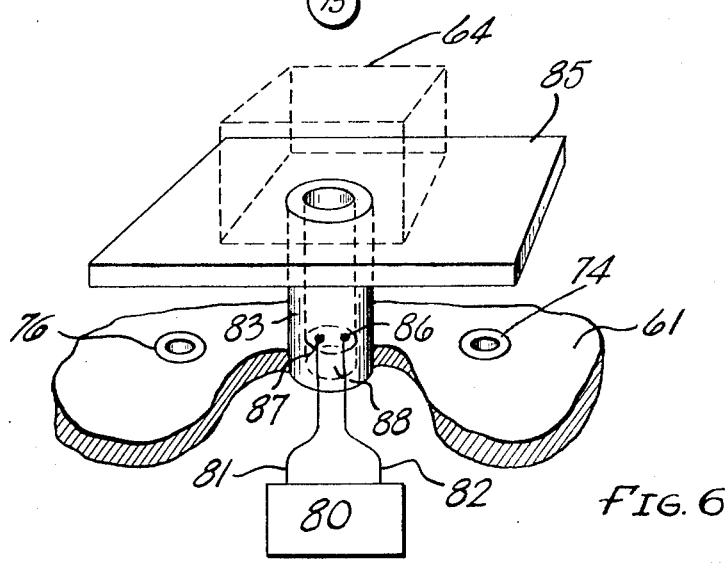
FIGURE 6 is a perspective view illustrating the mounting platform and ignition system shown in FIGURE 5 with a cross-sectional view of the bottom of the chamber.

FIGURES 5 and 6 show different equipment used in the process of the present invention wherein the porous mass 64 is mounted on a plate 85 in the chamber 61. It has been found that it is particularly preferred to mount the porous mass 64 in this manner as shown in the following Example VI.

Example VI

A rectangularly shaped chamber 61, was provided open at the top and fitted with a cover 62 and sealed to the chamber 61 with a pneumatically actuated locking means (which is not shown) to form a confined space 63. A vacuum system 65 was connected via pipe 66 through valve 67 through a pipe 71 and valve 72 into one side of the chamber 61. A transient thermal energy producing gaseous material supply system 68 was provided through valves 70 and 72 via pipes 69 and 71 to the chamber 61. A nonflammable and nondecomposable gas system 73 was provided through parallel pipes 74 and 76 through valve 75 and a T member 77 to the inside of and through the bottom of the chamber 61. An outlet pipe 78 was provided in the top of the chamber 61 for removal of the transient thermal energy producing gaseous material from the confined space 63. The equipment up to this point is basically the same as shown in FIGURES 1 and 3.

As shown in FIGURES 5 and 6, a plate 85 was mounted within the confined space 63 of the chamber 61 spaced up from the bottom by pipe 83 forming a conduit 84 for ignition which projected through the plate 85. The flow of the nonflammable and nondecomposable gaseous material through the confined space 63 is illustrated by arrows in FIGURE 5, wherein the plate 85 acts as a baffle to flow the nonflammable and nondecomposable gaseous material to the walls of the confined space 63 and also to slow the velocity of the nonflammable and nondecomposable gaseous material before it comes in contact with the porous mass 64. A spark gap 86 and 87 is provided within the conduit 84 of pipe 83 and electrically connected to the ignition system 80 through conductors 81 and 82 which are insulated from the cover 83 by an insulating member 88.

The process of Example I was repeated using the above described equipment. It was found that the polyester polyurethane foam was completely reticulated and that there was no deformation or other damage of the foam as a result of the combustion.

The equipment of FIGURES 5 and 6 is preferred because the sample is completely supported in the confined space 63 by the plate 85 which acts to uniformly distribute the nonflammable gaseous material around the porous mass 64. It will be appreciated that various ignition systems 80 such as ignition system 53 shown in FIGURE 4 can be used.

The initiation of a reaction in the combustible or decomposable gaseous material should be completed shortly after the introduction of the nonflammable gaseous material in order to prevent combustible or decomposable gaseous material from diffusing from the porous mass. It is preferred that the initiation be completed within five (5) seconds from the completion of the introduction of the nonflammable and nondecomposable gaseous material.

Upon initiating a reaction in the combustible or decomposable gaseous material within the porous mass the nonflammable and nondecomposable gaseous material prevents or substantially reduces the formation and propagation of pressure waves in the external void space between the walls defining the confined space and the porous mass. This is because the combustion or decomposition occurs substantially within the porous mass. In this manner, the porous mass is not deformed.

The confined space can be a chamber, such as a plastic chamber, which can be destroyed upon initiating a reaction in the combustible or decomposable gaseous material, but this is not preferred. It is preferred to use a rigid chamber which withstands the effects of the initiating of a reaction in the combustible or decomposable gaseous material, such as a steel chamber, for economic and safety reasons.

Various means for supporting the porous mass within the confined space can be used. With loose or granular pieces of material they can be confined by the chamber or by a screened cage with a mesh size smaller than the pieces of material. Further, various mounting means for the porous mass can be used. Further still various baffling means such as the plate 85 in FIGURE 5 can be used to insure uniform distribution of the nonflammable gaseous material in the confined space.

Various initiating means can be used to initiate a reaction in the combustible or decomposable gaseous material within the porous mass; thus, spark or glow devices such as spark or glow plugs are preferred, for ignition of a combustible gaseous material and ultraviolet radiation, localized pressure increases and shock waves, such as are produced on detonation of a standard high explosive detonation cap, are preferred for initiating a reaction in a decomposable gaseous composition. All of these variations will be obvious to one skilled in the art.

It is important to introduce the nonflammable and nondecomposable gaseous material into the chamber in a manner which maintains the combustible gaseous mixture within the porous mass. It is preferred that substantially laminar flow, rather than turbulent flow, of the nonflammable and nondecomposable gaseous material through the external void space be maintained. This accomplished by slowly sweeping the external void space with the nonflammable and nondecomposable gaseous material to remove the combustible or decomposable gaseous material. It is preferred to introduce between 1.5 and 3.0 times the volume of the external void space volume of nonflammable and nondecomposable gaseous material.

The nonflammable and nondecomposable gaseous material can also be introduced at high pressure into the closed chamber in order to dilute the combustible or decomposable gaseous material in the external void space or compress it into the porous mass sufficiently to thereby prevent the formation and propagation of damaging pressure waves in the void space. This alternative is not preferred since it is difficult to control the dilution in the void space without also diluting the combustible or decomposable gaseous material in portions of the porous mass because of inherent variations of gas permeability within the porous mass.

It is preferred to introdue the nonflammable and nondecomposable gaseous material into the confined space at a pressure as nearly equal to the initial combustible or decomposable gaseous material pressure so as to provide flow but which is greater than the final pressure of the combustible or decomposable gaseous material and then reduce the pressure of the nonflammable and nondecomposable gaseous material before initiation of the reaction by further opening the valves controlling the exit of the nonflammable gaseous material sufficiently to lower the pressure within the confined space. This allows combustible or decomposable gaseous material to come to the surface of the porous mass so that the surface is also treated upon initiation of a reaction in the combustible or decomposable gaseous material. In this manner, the treatment of the surface of the porous mass in contact with the nonflammable gaseous material is more complete as combustible or decomposable gaseous material which was swept from the surfaces and just below the surfaces of the porous mass is thus replaced.

It will be appreciated that the nonflammable and nondecomposable gaseous material and combustible or decomposable gaseous material can be provided in the confined space at standard, elevated or reduced pressures. At elevated pressures, a given mixture of the combustible or decomposable gaseous material generates more thermal energy upon initiation that at atmospheric pressures because of the greater amount of combustible or decomposable gaseous material in the confined space. It is advantageous to use elevated pressures where the porous mass requires a more energetic reaction and reduced pressures for a less energetic reaction.

We claim:

1. In a process for treating with transient thermal energy in a confined space the internal surfaces of a thermoplastic porous mass with internal void space of interconnected pores in communication with an outside surface of the thermoplastic porous mass which permit the introduction of a transient thermal energy producing gaseous material into the thermoplastic porous mass and which is damageable by pressure waves resulting from initiating a reaction in the transient thermal energy producing gaseous material provided within the internal void space of the thermoplastic porous mass and the confined space, the steps which comprise:

(a) providing the transient thermal energy producing gaseous material in the confined space and within the internal void space of the thermoplastic porous mass, the volume of the confined space being larger than the bulk volume of the thermoplastic porous mass to be treated such that there is external void space between the thermoplastic porous mass to be treated and walls defining the confined space;

(b) introducing a nonflammable and nondecomposable gaseous material into the external void space in sufficient amount to substantially reduce the pressure waves from the initiation of the reaction in the transient thermal energy producing gaseous material in the external void space without substantially removing the transient thermal energy producing gaseous material from the internal void space of the thermoplastic porous mass; and (c) initiating an exothermic reaction which is completed in less than five seconds in the transient thermal energy producing gaseous material within the internal void space of the thermoplastic porous mass before there is substantial diffusion between the transient thermal energy producing gaseous material and the nonflammable and nondecomposable gaseous material.

2. The process of claim 1 wherein the transient thermal energy producing gaseous material is effectively removed from the external void space by flow of the nonflammable and nondecomposable gaseous material through the external void space without removing substantial transient thermal energy producing gaseous material from the internal void space of the thermoplastic porous mass.

3. The process of claim 2 wherein the nonflammable and nondecomposable gaseous material is introduced into the confined space at a pressure slightly greater than the pressure of the transient thermal energy producing gaseous material in the confined space after which the pressure in the confined space is reduced so as to allow some of the transient thermal energy producing gaseous material in the internal void space of the thermoplastic porous mass to diffuse towards the outer surface of the thermoplastic porous mass.

4. The process of claim 1 wherein the nonflammable and nondecomposable gaseous material is introduced into the confined space at a pressure greater than that of the transient thermal energy producing gaseous material in the confined space so that the transient thermal energy producing gaseous material is compressed in the confined space by the nonflammable and nondecomposable gaseous material causing the transient thermal energy producing gaseous material to be driven into the thermoplastic porous mass.

5. The process of claim 1 wherein the densities of the nonflammable and nondecomposable gaseous material and the transient thermal energy producing gaseous material are similar.

6. The process of claim 1 wherein the volume of the nonflammable and nondecomposable gaseous material introduced is greater than the external void space volume.

7. The process of claim 6 wherein the volume ratio of the nonflammable and nondecomposable gaseous material introduced is up to three times greater than the external void space volume.

8. The process of claim 1 wherein the nonflammable and nondecomposable gaseous material is nitrogen.

9. The process of claim 1 wherein the thermoplastic porous mass is a plastic cellular material with interconnected cells forming the interval void space.

10. The process of claim 1 wherein the thermoplastic porous mass is contacting pieces of a plastic material with internal void space between the pieces.

11. The process of claim 1 wherein the thremoplastic porous mass is composed of an integral network of plastic material.

12. The process of claim 1 wherein the thermoplastic porous mass is composed of a polyurethane cellular plastic material.

13. The process of claim 1 wherein the confined space is a rigid chamber which contains the products of the transient thermal energy producing gaseous material after initiation of the reaction.

14. The proces of claim 1 wherein the transient thermal energy producing gaseous material is a combustible gaseous material.

15. The process of claim 14 wherein the combustible gaseous material is a mixture of natural gas and oxygen.

16. The process of claim 14 wherein the combustible gaseous material is a mixture of hydrogen and oxygen.

17. The process of claim 1 wherein the transient thermal energy producing material is a decomposable gaseous material.

18. The process of claim 17 wherein the decomposable gaseous material is acetylene.

References Cited

UNITED STATES PATENTS 3,175,025    3/1965    Geen et al. _____ 264—321 X

JULUIS FROME, Primary Examiner

PAUL A. LEIPOLD, Assistant Examiner

U.S. Cl. X.R.

161—168; 264—23, 85, 321; 431—1